(12) United States Patent
Smith et al.

(10) Patent No.: US 10,648,426 B2
(45) Date of Patent: May 12, 2020

(54) SINGLE ROW VANE ASSEMBLY FOR A THRUST REVERSER

(71) Applicant: HONEYWELL INTERNATIONAL INC., Morris Plains, NJ (US)

(72) Inventors: Danis Burton Smith, Chandler, AZ (US); Mark Knowles, Mesa, AZ (US); Shawn Alstad, Peoria, AZ (US); Robert Romano, Tempe, AZ (US); John Taylor Pearson, Phoenix, AZ (US); Morris Anderson, Mesa, AZ (US); David Robinson, Cave Creek, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 850 days.

(21) Appl. No.: 14/995,396

(22) Filed: Jan. 14, 2016

(65) Prior Publication Data

US 2017/0204809 A1 Jul. 20, 2017

(51) Int. Cl.
| | |
|---|---|
| *F02K 1/72* | (2006.01) |
| *F02K 1/62* | (2006.01) |
| *F01D 9/04* | (2006.01) |
| *F01D 25/24* | (2006.01) |
| *F01D 25/28* | (2006.01) |

(52) U.S. Cl.
CPC .............. *F02K 1/625* (2013.01); *F01D 9/041* (2013.01); *F01D 25/24* (2013.01); *F01D 25/28* (2013.01); *F02K 1/72* (2013.01); *F05D 2220/32* (2013.01)

(58) Field of Classification Search
CPC . F02K 1/625; F02K 1/72; F02K 1/566; F05D 2240/129
See application file for complete search history.

(56) References Cited

U.S. PATENT DOCUMENTS

| | | | |
|---|---|---|---|
| 2,620,623 | A | 12/1952 | Imbert |
| 3,172,256 | A | 3/1965 | Kerry et al. |
| 3,279,181 | A | 10/1966 | Beavers et al. |
| 3,640,468 | A | 2/1972 | Searle et al. |
| 3,717,304 | A | 2/1973 | Sutton |
| 4,073,440 | A | 2/1978 | Hapke |
| 4,183,478 | A | 1/1980 | Rudolph |
| 4,731,991 | A | 3/1988 | Newton |
| 4,790,495 | A | 12/1988 | Greathouse et al. |
| 5,228,641 | A | 7/1993 | Remiaoui |
| 5,507,143 | A | 4/1996 | Luttgeharm et al. |

(Continued)

FOREIGN PATENT DOCUMENTS

| | | |
|---|---|---|
| EP | 0848153 A1 | 6/1998 |
| EP | 0699273 B1 | 9/1999 |

(Continued)

OTHER PUBLICATIONS

Extended EP Search Report for Application No. 16206027.1-1607 dated Apr. 28, 2017.

(Continued)

*Primary Examiner* — Andrew H Nguyen
(74) *Attorney, Agent, or Firm* — Lorenz & Kopf, LLP

(57) ABSTRACT

A thrust reverser system comprising a single row vane assembly is provided. The provided thrust reverser system is capable of meeting performance requirements for turbine engines with reduced weight and cost.

6 Claims, 2 Drawing Sheets

(56) References Cited

U.S. PATENT DOCUMENTS

| | | |
|---|---|---|
| 5,671,598 A | 9/1997 | Standish |
| 6,000,216 A | 12/1999 | Vauchel |
| 6,029,439 A | 2/2000 | Gonidec et al. |
| 6,151,885 A | 11/2000 | Metezeau et al. |
| 6,151,886 A | 11/2000 | Vauchel |
| 6,968,675 B2 | 11/2005 | Ramlaoui et al. |
| 8,051,639 B2 | 8/2011 | Lair |
| 8,015,797 B2 | 9/2011 | Lair |
| 8,302,907 B2 | 11/2012 | Welch et al. |
| 8,316,632 B2 | 11/2012 | West et al. |
| 8,528,857 B2 | 9/2013 | Hillereau et al. |
| 8,783,010 B2 | 7/2014 | Guillois et al. |
| 9,109,462 B2 | 8/2015 | Suciu et al. |
| 9,719,466 B2 | 8/2017 | Nakhjavani |
| 2004/0068978 A1 | 4/2004 | Lair |
| 2004/0079073 A1* | 4/2004 | Ramlaoui ............ F02K 1/72 60/226.2 |
| 2005/0229584 A1* | 10/2005 | Tweedie ............ F02K 1/72 60/226.1 |
| 2008/0072571 A1 | 3/2008 | Beardsley |
| 2011/0146230 A1 | 6/2011 | LaChapelle |
| 2013/0056554 A1 | 3/2013 | Guillois et al. |
| 2013/0118599 A1 | 5/2013 | James |
| 2014/0030057 A1 | 1/2014 | Gormley |
| 2015/0267642 A1 | 9/2015 | Gormley |
| 2015/0291289 A1 | 10/2015 | Chandler et al. |
| 2015/0308376 A1* | 10/2015 | James ............ F02K 1/72 239/265.19 |
| 2016/0047333 A1 | 2/2016 | Starovic |
| 2016/0076487 A1* | 3/2016 | Nakhjavani ............ F02K 1/827 239/265.19 |
| 2016/0230702 A1 | 8/2016 | Charron |
| 2017/0009704 A1 | 1/2017 | Dong |
| 2017/0204809 A1 | 7/2017 | Smith |

FOREIGN PATENT DOCUMENTS

| | | |
|---|---|---|
| EP | 1416147 A1 | 5/2004 |
| EP | 2949910 A1 | 12/2015 |
| WO | 2014074144 A1 | 5/2014 |
| WO | 2014176427 A1 | 10/2014 |

OTHER PUBLICATIONS

Extended EP Search Report for Application No. 17151096.9-1607 dated Jun. 13, 2017.

Bangert, L., et al.; "Static Internal Performance of a Nonaxisymmetric Vaned Thrust Reverser With Flow Splay Capability," Compiled and Distributed by the NTIS, U.S. Department of Commerce, NASA, 1989.

EP Examination Report for Application No. 16206027.1 dated Sep. 7, 2018.

USPTO Office Action for U.S. Appl. No. 15/005,357 dated Nov. 28, 2018.

* cited by examiner

SINGLE ROW VANE ASSEMBLY FOR A THRUST REVERSER

TECHNICAL FIELD

The present invention relates to a thrust reverser system for a turbine engine, and more particularly to a thrust reverser with a single row vane assembly.

BACKGROUND

When turbine-powered aircraft land, the wheel brakes and the imposed aerodynamic drag loads (e.g., flaps, spoilers, etc.) of the aircraft may not be sufficient to achieve the desired stopping distance, therefore, most turbine-powered aircraft include thrust reversers. Turbine-powered aircraft typically include aircraft powered by turbofan engines, turbojet engines, or the like. Thrust reversers enhance the stopping power of these aircraft by redirecting the turbine engine exhaust airflow in order to generate reverse thrust. When stowed, the thrust reverser typically forms a portion of the engine nacelle and forward thrust nozzle. When deployed, the thrust reverser typically redirects at least a portion of the airflow (from the engine fan and/or core exhaust) forward and radially outward, to help decelerate the aircraft.

Various thrust reverser designs are commonly known, and the particular design utilized depends, at least in part, on the engine manufacturer, the engine configuration, and the propulsion technology being used. Thrust reverser designs used most prominently with turbofan engines fall into two general categories: (1) fan flow thrust reversers, and (2) mixed flow thrust reversers. Fan flow thrust reversers typically wrap circumferentially around the engine core and affect only the airflow discharged from the engine fan. Whereas, mixed flow thrust reversers typically reside aft of the engine core and affect both the fan airflow and the airflow discharged from the engine core (core airflow).

Typically, deployment of the thrust reverser means translating aft one or more sleeves or cowls ("transcowls") thereby creating a circumferential aperture and exposing a plurality of rows and columns of cascade vanes disposed therein. Some thrust reversers use a blocking mechanism, such as two or more pivoting doors that simultaneously rotate, to block the forward thrust flow path as the transcowl translates aft. The blocking mechanism redirects engine airflow, generally forcing it to discharge through the aforementioned plurality of cascade vanes disposed within the aperture. The number and placement of the cascade vanes is generally application specific and related to aiding in the deceleration of the aircraft.

While thrust reversers utilizing a plurality of cascade vanes have satisfied many aircraft design demands until now, emerging aircraft designs continue to drive a demand for thrust reversers with reduced weight, and reduced manufacturing cost. Hence, there is a need for a thrust reverser design capable of meeting performance requirements while reducing aircraft weight and cost of ownership. The provided thrust reverser system meets this need.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A thrust reverser system for a turbine engine comprising a nacelle surrounding the turbofan engine is provided. The thrust reverser system comprising: a support structure configured to be mounted to the engine; a transcowl mounted on the support structure and forming a portion of the nacelle, the transcowl movable between a first position, in which a front edge of the transcowl abuts the support structure, and a second position, in which an aperture is formed between the front edge and the support structure; and a single row vane assembly disposed within the aperture.

Another thrust reverser system for a turbine engine is provided. The thrust reverser system comprises: a support structure configured to be mounted to the engine; a transcowl mounted on the support structure and comprising a front edge, the transcowl movable between a first position, in which the front edge abuts the support structure, and a second position, in which an aperture is formed between the front edge and the support structure; and a blocking assembly mounted within the transcowl and configured to direct engine airflow to discharge through the aperture, to thereby generate reverse thrust, when the transcowl is in the second position; and a single row vane assembly disposed within the aperture.

Also provided is a turbine engine, comprising: a thrust reverser system, comprising (a) a support structure configured to be mounted to the engine; (b) a transcowl mounted on the support structure and comprising a front edge, the transcowl movable between a first position, in which the front edge abuts the support structure, and a second position, in which an aperture having an aperture length $L2$ is formed between the front edge and the support structure; (c) a blocking assembly mounted within the transcowl and configured to direct engine airflow to discharge through the aperture, to thereby generate reverse thrust, when the transcowl is in the second position; and a single row vane assembly disposed within the aperture and comprising a first vane trailing edge that is positioned a distance $L1$ from the support structure, and wherein $L1$ is less than $L2$.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments.

Various embodiments are directed to a thrust reverser system suitable for a turbine engine, and methods for producing the same. Turbofan and turbojet engines having translatable cowl thrust reversers are suitable applications; the thrust reverser itself may take many forms, such as, but not limited to, a fan flow and mixed flow variety. As will be apparent from the detail below, the exemplary embodiments advantageously provide reductions in weight and manufacturing cost while meeting the performance requirements for aircraft turbine engines. The embodiments described below are merely examples and serve as a guide for implementing the novel systems and methods herein on any industrial, commercial, military, or consumer turbine engine application. As such, the examples presented herein are intended as non-limiting.

Figure 1:
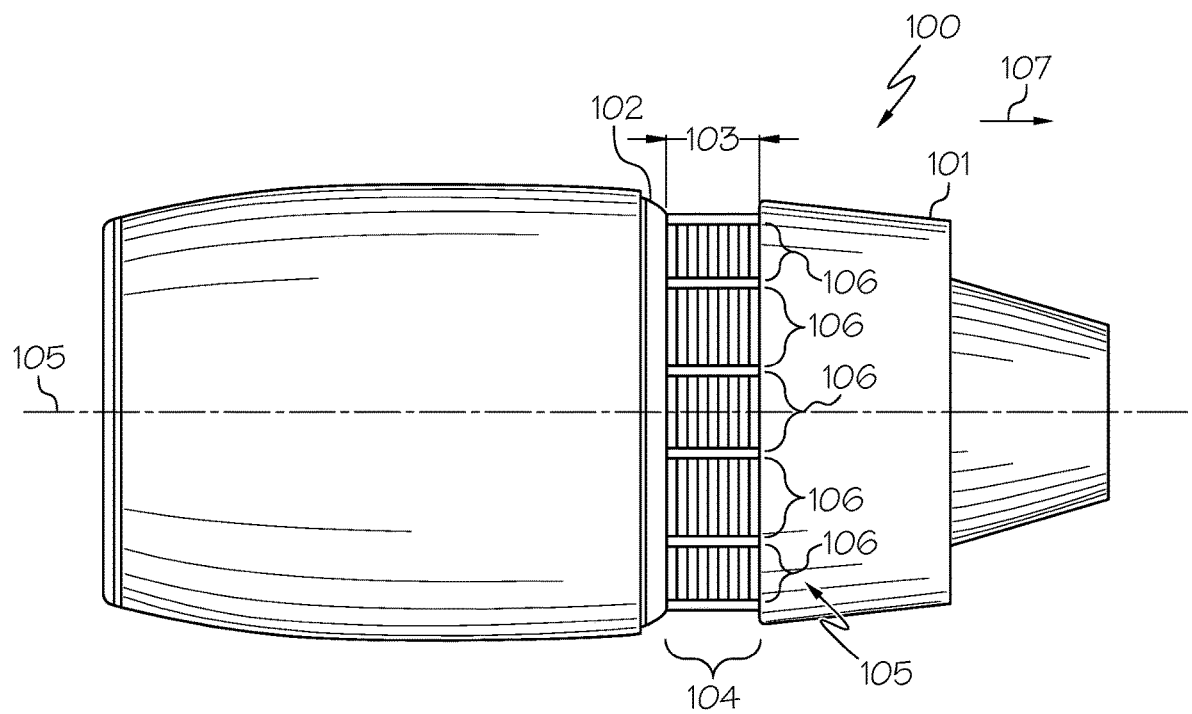
FIG. 1 is a prior art perspective view of a turbofan engine with a thrust reverser system in a deployed position.

FIG. 1 is a prior art perspective view of a turbofan engine nacelle with a thrust reverser system in a deployed position. The turbofan engine (not shown) is a component of an aircraft's propulsion system that typically generates thrust by means of an accelerating mass of gas. In FIG. 1, the turbofan engine is substantially encased within an aerodynamically smooth outer covering, the nacelle, which comprises a thrust reverser system including (i) a stationary support structure 102, and (ii) an annular translatable cowl, or transcowl 101. Stationary support structure 102 and transcowl 101 wrap circumferentially around an engine centerline 105, thereby providing a flow path for engine exhaust flow when the aircraft is generating forward thrust.

When the transcowl 101 is deployed, or translated aft (shown by arrow 107), aperture 103 is created between support structure 102 and the front edge of transcowl 101. Within aperture 103, vanes are arranged in a grid comprising a plurality of columns 106, each column of the plurality of columns 106 comprising a plurality of rows 104. Rows 104 are spaced apart in a direction that is substantially parallel to (or coaxial with) the engine centerline 105, and columns 106 are spaced apart circumferentially around the engine centerline 105. The grid of vanes arranged as a plurality of rows 104 in a plurality of columns 106, as shown, is generally referred to as a "cascade vane" arrangement. The cascade vane arrangement is disposed within the aperture to assist in redirecting the exhaust airflow so as to decelerate the aircraft.

Figure 2:
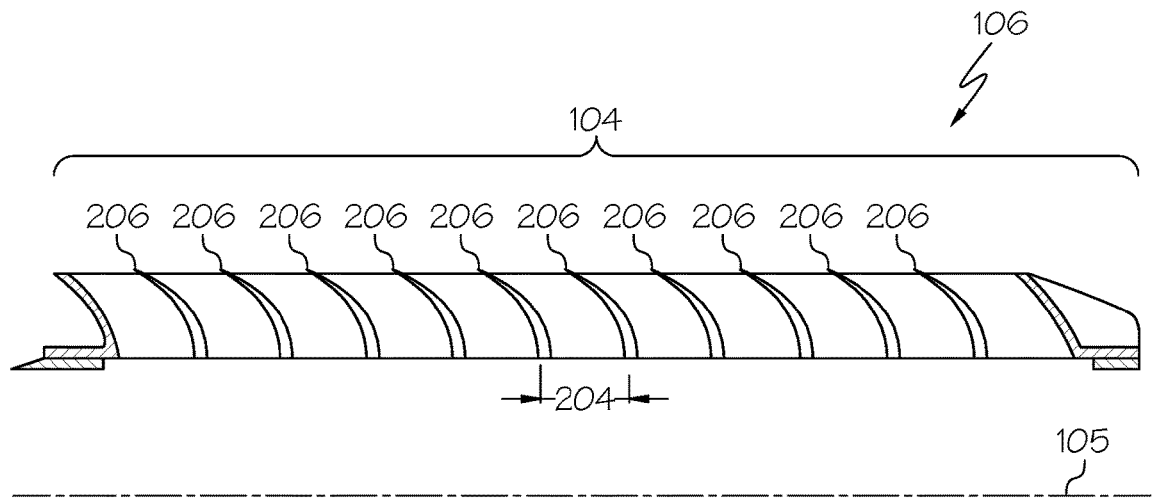
FIG. 2 is an enlarged cross sectional view of a column of cascade vanes from a prior art thrust reverser such as that shown in FIG. 1.

FIG. 2 is an enlarged cross sectional view of a column of cascade vanes from a prior art thrust reverser such as that shown in FIG. 1. FIG. 2 provides an enlarged view of one column 106, above engine centerline 105, having a plurality of rows 104. There is one vane 206 per row. The vanes 206 are disposed within the aperture 103, spaced apart by distance 204. Vanes 206 serve to redirect engine airflow during reverse thrust, thereby being a design specific part of an active reverse flow path. As may be readily appreciated, aperture 103 extends circumferentially around the engine centerline 105, and the cascade vane assembly extends circumferentially around the engine centerline 105 therewith. Accordingly, a cascade vane assembly can require quite a lot of vanes 206 to perform its required function. Each vane 206 employed has an associated amount of material; increased material translates into increased weight and increased manufacturing cost.

Figure 3:
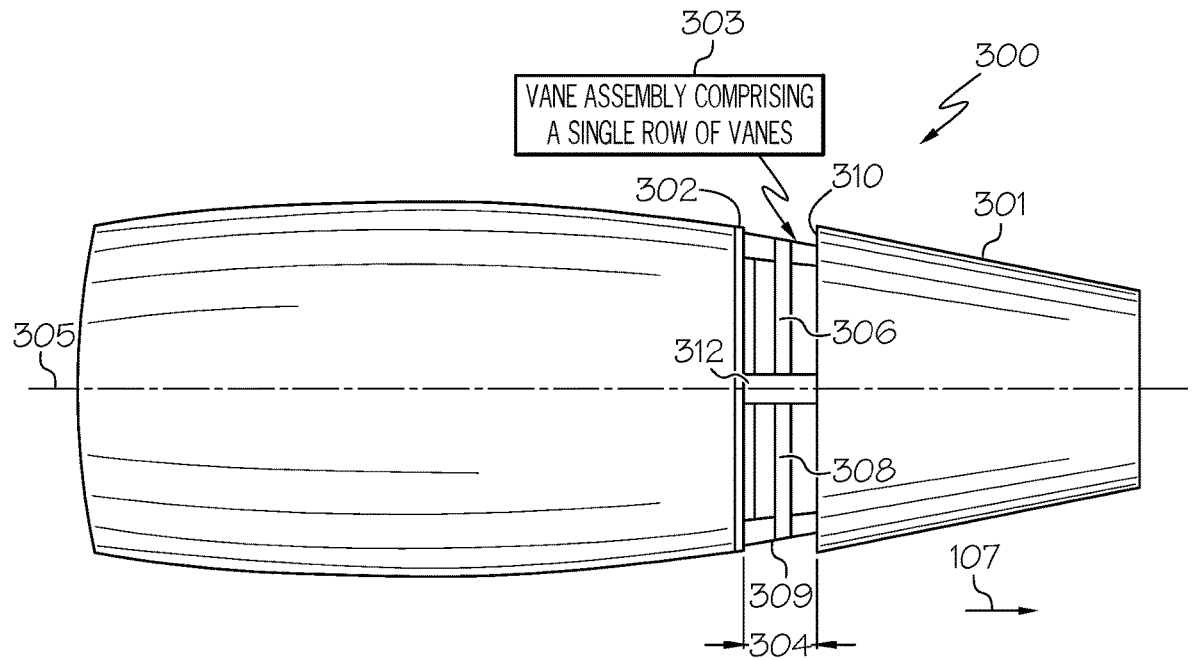
FIG. 3 is a three dimensional image of a turbofan engine with a thrust reverser system having a single row vane assembly, in accordance with the exemplary embodiment.

To reduce the number of vanes 206, the number of rows and/or the number of columns may be reduced. Accordingly, FIG. 3 provides a three dimensional image 300 of a thrust reverser system having a single row of vanes, in accordance with the exemplary embodiment. In FIG. 3, the transcowl 301 is shown deployed, however, in a stowed (first) position, the front edge 310 of transcowl 301 abuts circumferentially with the support structure 302. The deployed transcowl 301 is shown with the front edge 310 of transcowl 301 moved aft (arrow 107), forming an aperture 309 with aperture length 304 that is bounded on one side by front edge 310. The aperture 309 is understood to extend substantially circumferentially around engine centerline 305. Single row vane assembly 303 is disposed within the aperture 309 and configured to redirect the exhaust airflow therethrough.

The support structure 302 may also serve to mount the entire thrust reverser system 300 to the turbofan engine. One or more side beams 312, coupled to the support structure 302 and extending aft therefrom, are configured to slidably engage with transcowl 301. The support structure 302 and associated side beams 312 provide a rigid annular support structure to which a single row vane assembly 303 and moveable thrust reverser components may be mounted.

Although not the focus of the present invention, a blocking assembly is generally mounted within the transcowl 301, and performs a blocking function for the engine exhaust flow, thereby redirecting it (directing it forward and radially). Blocking assembly movement is substantially concurrent with the movement of the transcowl 301, such that, when the transcowl 301 is in the reverse thrust (or second) position, the blocking assembly directs engine airflow to discharge through the aperture, thereby generating reverse thrust. This re-direction of engine exhaust flow works to slow the aircraft. In practice, the blocking assembly often comprises displaceable blocker doors and associated mounting and actuation hardware and software. A variety of different mechanisms may be used to couple displaceable blocker doors to transcowls such that they stow and deploy in tandem. These mechanisms could range from a single connecting link to a complex kinematic linkage system. In any of the possible combinations, this linkage system is what transfers the linear transcowl motion into a blocking function, such as, by rotary (pivoting) internal door motion.

Also not the subject of the present invention, it is readily appreciated that an actuator (not shown), or other type of movable thrust reverser component causes transcowl 301 to move. The actuator may be mounted to support structure 302 and coupled to transcowl 301. When the actuator extends, it causes the transcowl 301 to translate from a stowed (first) position to a deployed (second) position. The actuator may also retract and return transcowl 301 from the deployed position to the stowed position. In practice, an actuator may comprise mechanical and/or electrical components, and may be responsive to aircraft engine system commands. Accordingly, embodiments of a single row vane assembly 303 may comprise components or features for accommodating or coupling to an actuator.

In various embodiments of the single row vane assembly 303, the number of columns may vary, and the number of vanes varies therewith; however, the embodiments presented herein configure the vanes to form a "single row." As used herein, "a single row" vane assembly means that any imaginary line drawn parallel with the engine centerline through aperture 309 (i.e., between the support structure 302 and the transcowl 301) intersects at most one vane, circumferentially disposed within aperture 309, as is depicted in FIG. 3. In FIG. 3, single row vane assembly 303 is shown comprising one row having two columns, or two vanes respectively: vane 306 and vane 308; however, a person with skill in the art will readily appreciate that the embodiment shown in FIG. 3, when rotated in three dimensions, will have four columns, and therefore four vanes.

Figure 4:
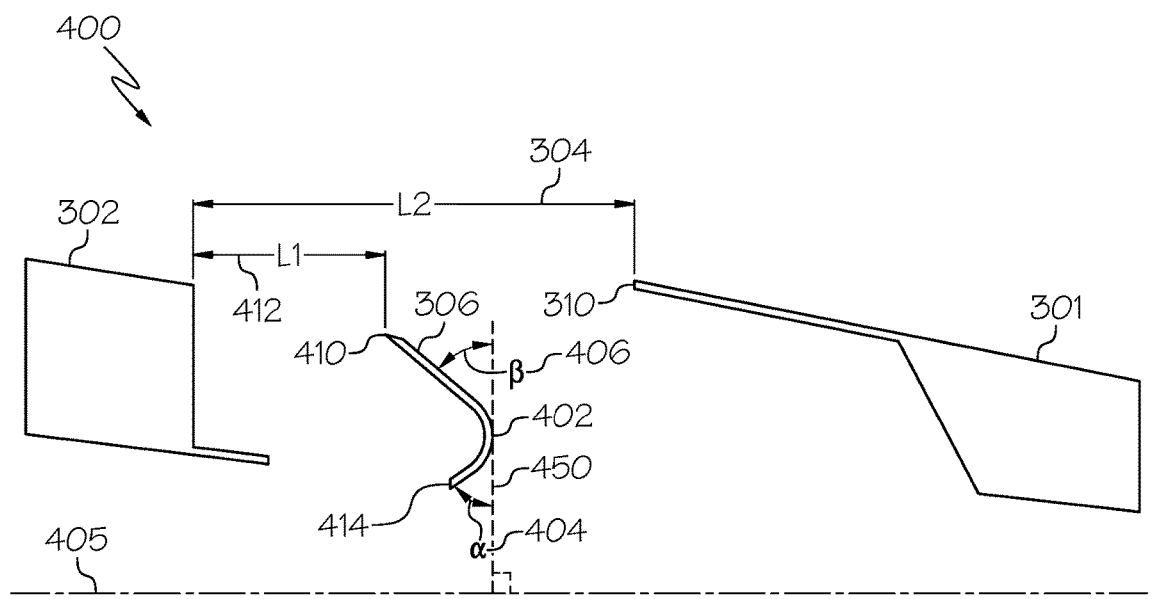
FIG. 4 is an enlarged cross sectional view of a portion of the single row vane assembly of FIG. 3, in accordance with the exemplary embodiment.

In three dimensions, the single row vane assembly 303 is extended circumferentially, and appears as substantially circular. It is also understood that, in three dimensions, single row vane assembly 303 may include components or features for mounting to the side beams 312 and/or accommodating an actuator (not shown), as described above. Single row vane assembly 303 is mounted substantially coaxially with the engine centerline 305 and, accordingly, the thrust reverser centerline 405. As previously mentioned, single row vane assembly 303 may comprise a plurality of vanes without straying from the scope of the invention. The number of columns, as well as the position, size, material, and etc. of the vanes employed, is dependent upon the individual thrust reverser system design. FIG. 4 provides more detail as to the configuration of a single row vane assembly 303.

FIG. 4 is an enlarged cross sectional view 400 of a single row vane assembly of FIG. 3, in accordance with the exemplary embodiment. The single row vane assembly 303 comprises a first vane trailing edge 410 positioned at distance L1 412 from the support structure 302. Aperture length 304 is designated L2. The ratio of the first predetermined distance L1 to the aperture length L2 (304) is substantially a first predetermined ratio. In an embodiment, the first predetermined ratio is within a range of about 0.3 to about 0.5.

The single row vane assembly is further shaped to comprise a leading edge 414 and a knee 402. The knee 402 is defined by a radius of curvature based on an angle alpha 404 and an angle beta 406. As shown, single row vane assembly comprises vane 306, first vane trailing edge 410 extends forward from the knee 402 at angle beta 406 relative to a plane 450. Plane 450 is perpendicular to thrust reverser centerline 405, which is substantially collinear with the engine centerline 305. First vane leading edge 414 extends forward from the knee 402 at an angle alpha 404 from the same plane 450. In an embodiment, the single row vane assembly 303 is shaped to achieve an angle alpha 404 of greater than forty-five degrees and an angle beta 406 in the range of thirty degrees to seventy degrees.

As mentioned, single row vane assembly 303 may comprise a plurality of vanes, such as vane 306 and vane 308, perhaps more. In embodiments having a plurality of vanes, each vane of the plurality of vanes comprises a vane trailing edge that is positioned at a distance L1 from support structure 302 such that, for each vane of the plurality of vanes, the ratio of each distance L1 to the aperture length L2 (304) is substantially the first predetermined ratio, or, within a range of about 0.3 to about 0.5. Accordingly, each vane of the plurality of vanes is shaped to achieve an angle alpha of greater than forty-five degrees and an angle beta in the range of thirty degrees to seventy degrees.

The single row vane assembly 303 embodiments described herein advantageously provide a thrust reverser system capable of meeting performance requirements for turbine engines with reduced weight and cost over existing thrust reversers.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Some of the embodiments and implementations are described above in terms of functional and/or logical block components (or modules), for example, control circuitry or the actuator referenced but not shown. However, it should be appreciated that such block components (or modules) may be realized by any number of hardware, software, and/or firmware components configured to perform the specified functions. To clearly illustrate this interchangeability of hardware and software, these illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

What is claimed is:

1. A thrust reverser system for a turbine engine comprising a nacelle surrounding the engine, the thrust reverser system comprising:

a support structure configured to be mounted to the engine;

a transcowl mounted on the support structure and forming a portion of the nacelle, the transcowl movable between a first position, in which a front edge of the transcowl abuts the support structure, and a second position, in which the front edge of the transcowl is moved aft of the support structure by an aperture length that is measured from an aft end of an outer surface of the support structure to an outer surface of the front edge of the transcowl, forming an aperture between the front edge and the support structure, the aperture extending circumferentially around an engine centerline; and wherein the outer surface of the support structure and the outer surface of the front edge of the transcowl form an outer flow surface of the engine when the transcowl is in the first position; and a single row vane assembly circumferentially disposed within the aperture, and coaxial with the engine centerline, the single row vane assembly configured such that any imaginary line drawn parallel with the engine centerline through the aperture intersects at most one vane, the vane comprising a knee, a first vane leading edge, and a first vane trailing edge;

the knee of the vane is located on a plane that is perpendicular to a thrust reverser centerline, the first vane leading edge extends forward from the knee at an angle alpha, the first vane trailing edge extends forward from the knee at an angle beta; and a forward-most portion of the first vane trailing edge is a first distance from the aft end of the outer surface of the support structure, measured parallel to the engine centerline, the first distance being less than or equal to half the aperture length.

2. The thrust reverser system of claim 1, comprising a blocking assembly mounted within the transcowl and configured to direct engine airflow to discharge through the aperture, to thereby generate reverse thrust, when the transcowl is in the second position.

3. The thrust reverser system of claim 2, wherein a ratio of the first distance to the aperture length is a first predetermined ratio.

4. The thrust reverser system of claim 3, wherein the first predetermined ratio is within the range of 0.3 to 0.5.

5. A turbine engine, comprising:

a thrust reverser system, comprising a support structure configured to be mounted to the engine;

a transcowl mounted on the support structure and comprising a front edge, the transcowl movable between a first position, in which the front edge abuts the support structure, and a second position, in which the front edge is moved aft of the support structure by an aperture length that is measured from an aft end of an outer surface of the support structure to an outer surface of the front edge of the transcowl, forming an aperture that extends circumferentially around an engine centerline;

wherein the outer surface of the support structure and the outer surface of the front edge of the transcowl form an outer flow surface of the engine when the transcowl is in the first position; and a blocking assembly mounted within the transcowl and configured to direct engine airflow to discharge through the aperture, to thereby generate reverse thrust, when the transcowl is in the second position; and a single row vane assembly circumferentially disposed within the aperture, and coaxial with an engine centerline, the single row vane assembly configured such that any imaginary line drawn parallel with the engine centerline through the aperture intersects at most one vane, the vane having a knee, a vane leading edge and a vane trailing edge;

the knee of the vane is located on a plane that is perpendicular to a thrust reverser centerline, the first vane leading edge extends forward from the knee at an angle alpha, the first vane trailing edge extends forward from the knee at an angle beta; and a forward-most portion of the first vane trailing edge is a first distance from the aft end of the outer surface of the support structure, measured parallel to the engine centerline, the first distance being less than the aperture length; and wherein the first distance is less than half of the aperture length.

6. The turbine engine of claim 5, wherein a ratio of the first distance to the aperture length is greater than 0.3 and less than 0.5 and further comprising one or more side beams (i) coupled to the support structure, and (ii) extending aft therefrom, and wherein the vane is mounted between two side beams of the one or more side beams.

\* \* \* \* \*